(12) United States Patent
Wei

(10) Patent No.: US 7,511,852 B2
(45) Date of Patent: Mar. 31, 2009

(54) SYSTEM AND METHOD FOR VARIABLE COPYING OR REPRODUCING A PLURALITY OF DOCUMENTS

(75) Inventor: Hongfeng Wei, Garden Grove, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 953 days.

(21) Appl. No.: 10/385,126

(22) Filed: Mar. 10, 2003

(65) Prior Publication Data

US 2004/0179235 A1    Sep. 16, 2004

(51) Int. Cl.
  *G06K 15/02* (2006.01)
  *H04N 1/387* (2006.01)
  *H04N 1/21* (2006.01)
(52) U.S. Cl. .............. 358/1.18; 358/1.16; 358/450; 358/453; 358/1.15; 358/1.13; 358/3.24; 358/3.21; 358/3.26; 358/3.27
(58) Field of Classification Search ......... 715/505–508; 358/1.18, 1.16, 450, 453, 3.24
See application file for complete search history.

(56) References Cited

U.S. PATENT DOCUMENTS

| | | | | | |
|---|---|---|---|---|---|
| 5,544,285 | A | * | 8/1996 | Glaser et al. | 715/506 |
| 5,563,999 | A | * | 10/1996 | Yaksich et al. | 715/507 |
| 5,717,939 | A | * | 2/1998 | Bricklin et al. | 715/503 |
| 5,774,887 | A | * | 6/1998 | Wolff et al. | 707/1 |
| 5,850,490 | A | * | 12/1998 | Johnson | 382/306 |
| 5,872,640 | A | * | 2/1999 | Cohen et al. | 358/434 |
| 6,625,499 | B2 | * | 9/2003 | Abdalla | 700/25 |
| 6,959,414 | B1 | * | 10/2005 | Kakehashi | 715/507 |

* cited by examiner

*Primary Examiner*—Twyler L Haskins
*Assistant Examiner*—Pawandeep S Dhingra
(74) *Attorney, Agent, or Firm*—Tucker Ellis & West LLP

(57) ABSTRACT

This invention is directed to a system and method for variable copying or reproducing for a plurality of documents. More particularly, this invention is directed to a system and method for reproducing a large quantity of documents wherein certain selected information within the document varies, but the rest of the content is identical.

21 Claims, 3 Drawing Sheets

SYSTEM AND METHOD FOR VARIABLE COPYING OR REPRODUCING A PLURALITY OF DOCUMENTS

BACKGROUND OF THE INVENTION

This invention is directed to a system and method for variable copying or reproducing for a plurality of documents. More particularly, this invention is directed to a system and method for reproducing a large quantity of documents wherein certain selected information within the document varies, but the rest of the content is identical.

There are document reproduction jobs wherein the information contained in each of the documents is identical, except for certain selected data. For example, an insurance company will typically copy or reproduce documents or letters for its customers wherein the customer name, address, and policy number will vary for each customer but the content of the documents or letters are the same. The insurance copy would have to copy or reproduce each document or letter individually, inserting the information specific to each customer in each document or letter. By copying or reproducing each document individually increases the time, effort, and cost associated with large document copying or reproduction jobs as well as a greater likelihood of errors.

There is a need for system and method for variably copying or reproducing documents wherein the information contained in each document is identical except for certain selected data.

SUMMARY OF THE INVENTION

In accordance with the present invention, there is provided a system and method for variably copying or reproducing a plurality of documents.

In accordance with the present invention, there is provided a system and method for easily producing documents wherein one copy is used to copy or reproduce documents wherein certain selected data is different in each document.

Further, in accordance with the present invention, there is provided a system and method for easily reproducing documents wherein the information contained in each document is identical except for certain selected data, which reduces the time, effort, and cost associated with copying or reproducing such documents.

Still further in accordance with the present invention, there is provided a document reproduction system wherein the system comprises means adapted for acquiring document image data representative of a document image, a memory for storing the document image data, and means adapted for acquiring overlay placement data representative of at least one selected overlay region of the image data. The system further comprises overlay data input means adapted for receiving into the memory overlay data representative of supplemental information associated with the document image data, association means adapted for selectively associating the overlay data with the at least one overlay region, and generating means adapted for generating in the memory composite image data including the document image data and the overlay data disposed in an associated overlay region.

Still further in accordance with the present invention, there is provided a method for reproducing document. The method comprising the steps of acquiring document image data representative of a document image and storing the document image data in memory. Overlay placement data representative of at least one selected overlay region of the image data is acquired and the overlay data representative of supplemental information associated with the document image data is received into the memory. The overlay data is selectively associated with the at least one overlay region and the composite image data, including the document image data and the overlay data disposed in an associated overlay region, is generated.

These and other advantages, aspects, and features will be understood by one of ordinary skill in the art upon reading and understanding the specification.

DETAILED DESCRIPTION OF THE PREFERRED EMBODIMENTS

Figure 1:
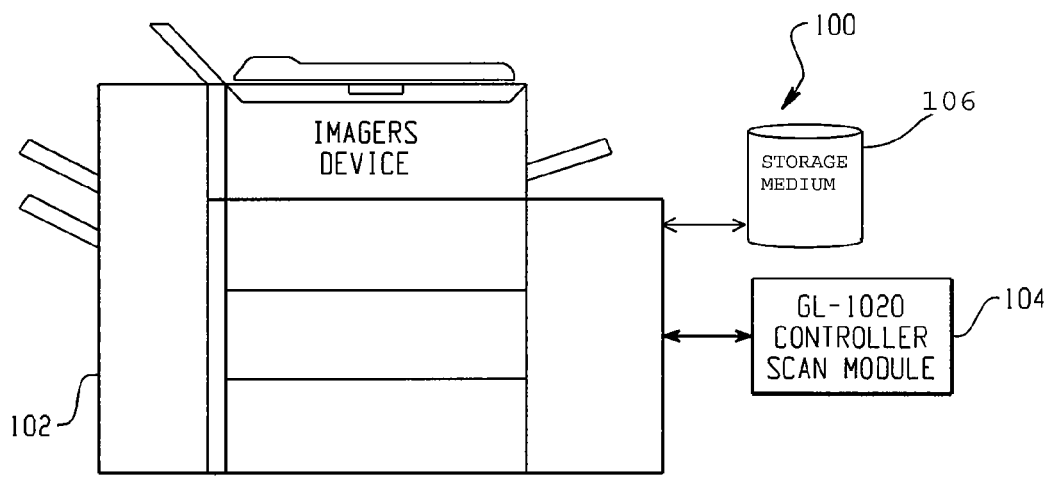
FIG. 1 is a block diagram illustrating the preferred embodiment of the system according to the present invention.

The present invention is directed to a system and method for variably copying or reproducing a plurality of documents. FIG. 1 shows a block diagram preferred embodiment of the system according to the present invention generally designated as 100. The system comprises a document reading device 102, such as a scanner or copier, for generating image data. The document reading device is any suitable document reading device known in the art. Preferably, the document reading device is a scanning device or a copying device. More preferably, the document reading device is a copying device. Suitable commercially available document reading devices include, but are not limited to, the Toshiba e-Studio Series Controller. The document reading device further comprises a controller 104 which controls the functions of the document reading device and includes storage means 106 for storing the image data.

Figure 2:
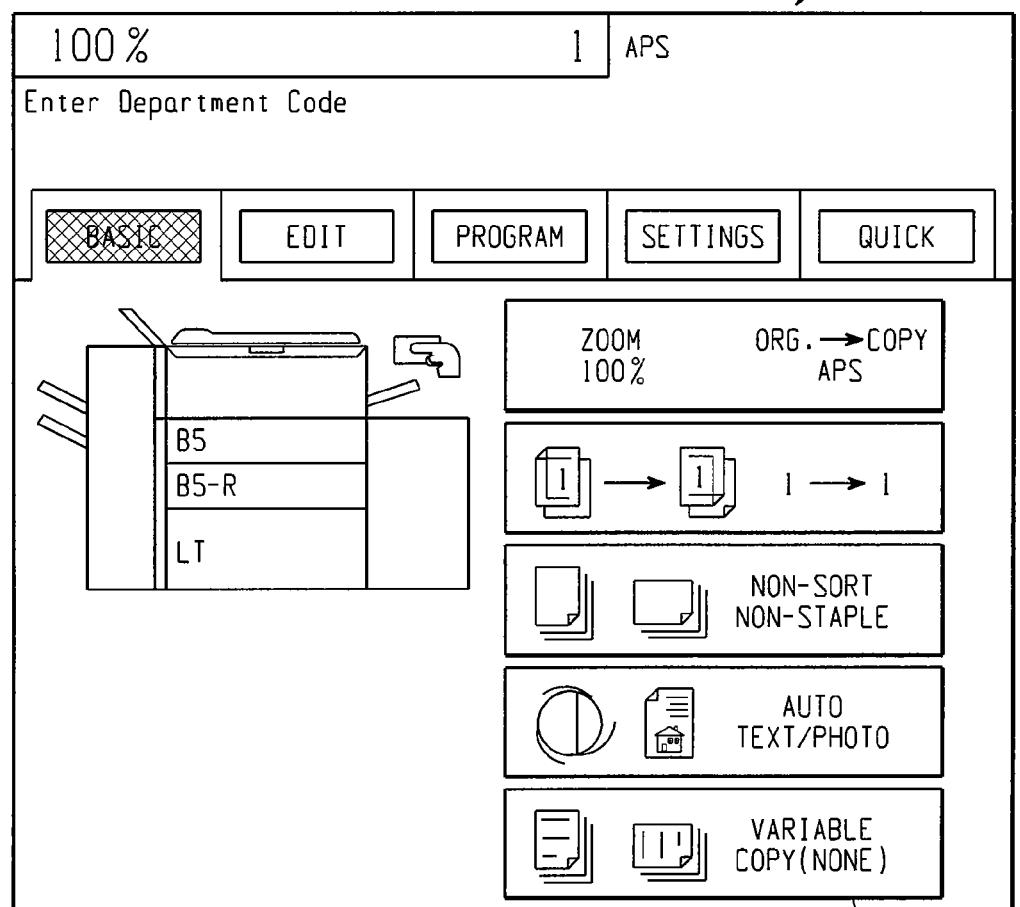
FIG. 2 is a sample template for enabling the system to variably copy or reproduce the documents.

In operation, the user inputs the document or other data into the document reading device to generate the image data and selects the desired settings for generating the image data by any suitable means. FIG. 2 shows a preferred sample screen display 200 for enabling the system to variably copy or reproduce the documents. The user selects the variable copying option shown as 202. Once the user has selected this option, the user can then proceed to select the parameters for the overlay region.

Figure 3:
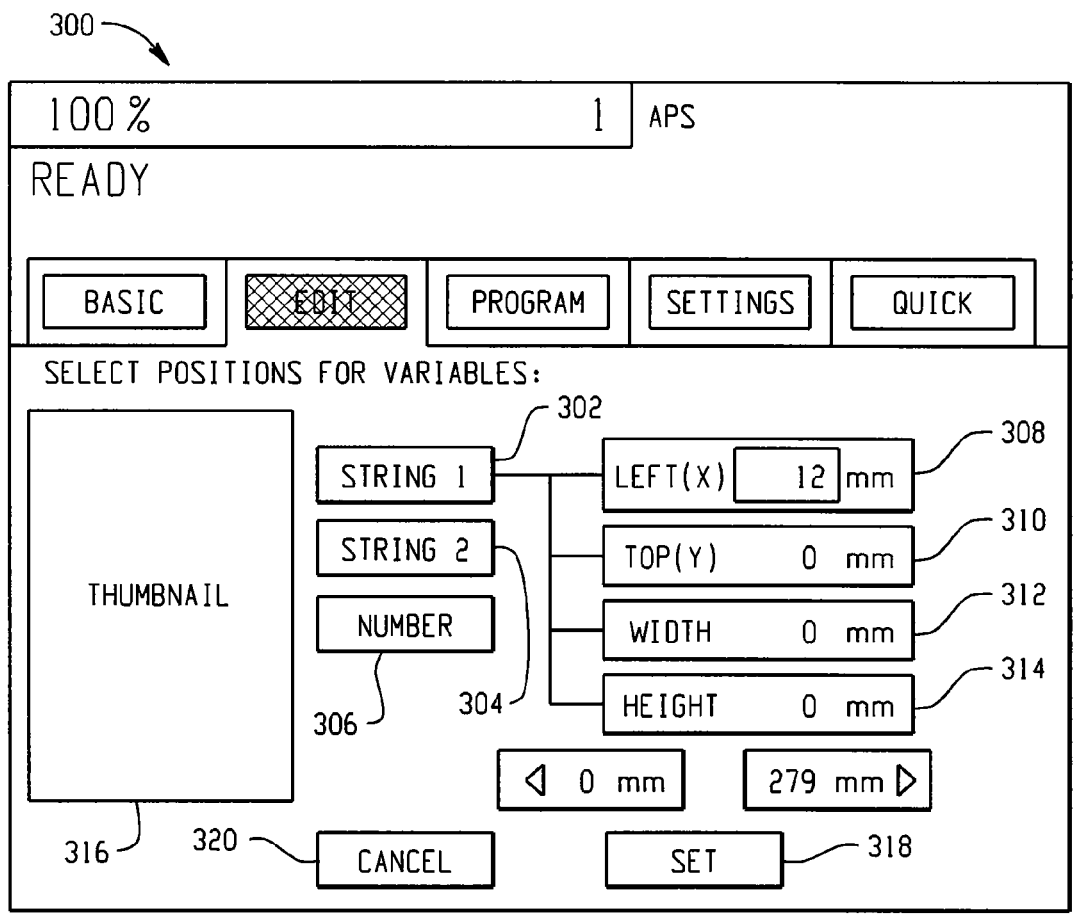
FIG. 3 is a sample template for selecting the location of the overlay region.

FIG. 3 shows a preferred sample screen display 300 for selecting the location of the overlay region. The user first selects the overlay region. Preferably, the overlay regions are associated with string variables or number variables as shown by 302, 304, and 306. Once the user has selected a variable associated with a particular overlay region, the user specifies the location of the overlay region on the document. The user specifies the position of the left side of the region 308, the top of the region 310, the width of the region 312, and the height of the region 314. A thumbnail representation 316 of the document showing the location of the overlay region is displayed. Once the user has selected the location of the overlay regions, the user can then select the Set button 318 to save the setting or the Cancel button 320 to cancel the settings entered.

Figure 4:
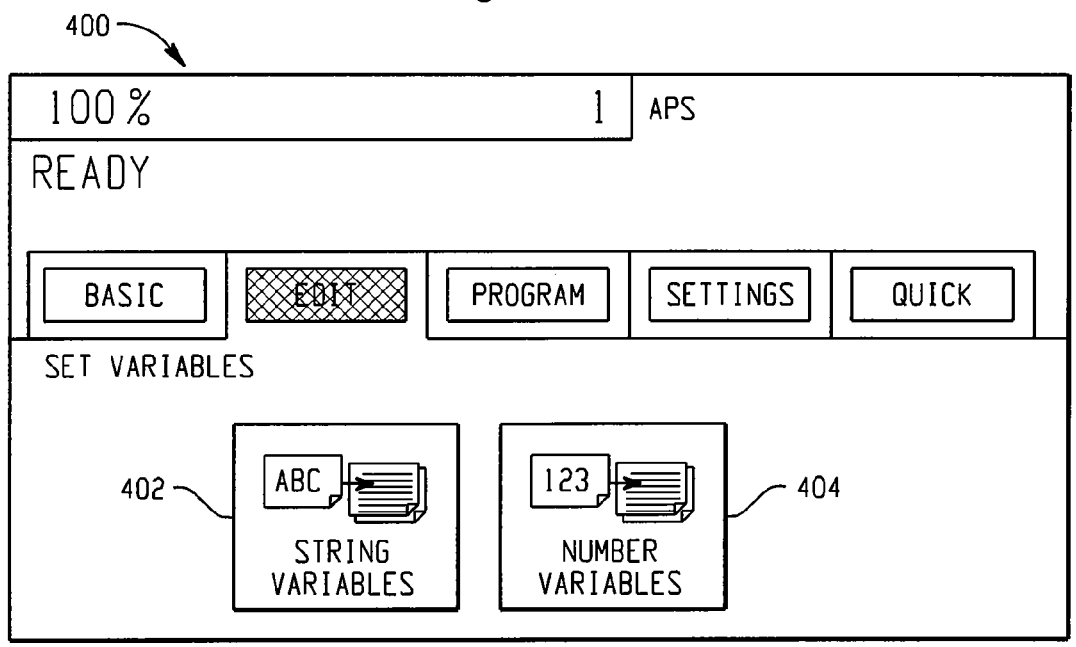
FIG. 4 is a sample template for selecting a variable for the overlay region.
Figure 5:
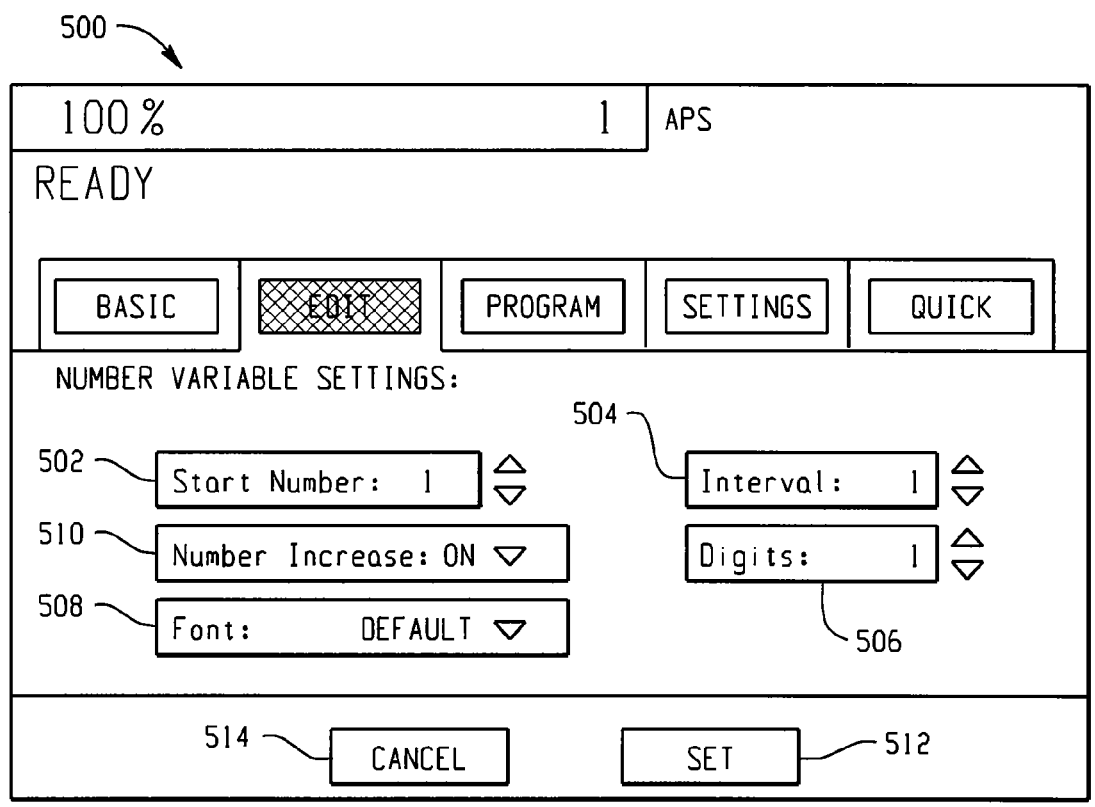
FIG. 5 is a sample template for selecting the parameters for a number variable.

FIG. 4 shows a preferred sample screen display 400 for selecting a variable to be associated with an overlay region. The user can select either a string variable 402 or a number variable 404. If the user selects a number variable, the user then inputs the parameters associated with such number variable. FIG. 5 is a preferred sample screen display 500 for selecting such parameters. The user must specify a start number 502 that will used in the first copy, an interval that is used to increase the number automatically 504, the number of digits to be used 506, and the font for the numbers 508. The user may also enter a number increase 510. If this option is selected the number variable will be automatically increased by the interval value. For example, if the interval selected is 2, the start number is 1, and the number of digits is 8, then the first copy will contain number 00000001 in the selected overlay region and the second copy will contain number 00000003 in the second overlay region. Once the user has selected the parameters for the number variable, the user can then select the Set button 512 to save the setting or the Cancel button 514 to cancel the settings entered.

Figure 6:
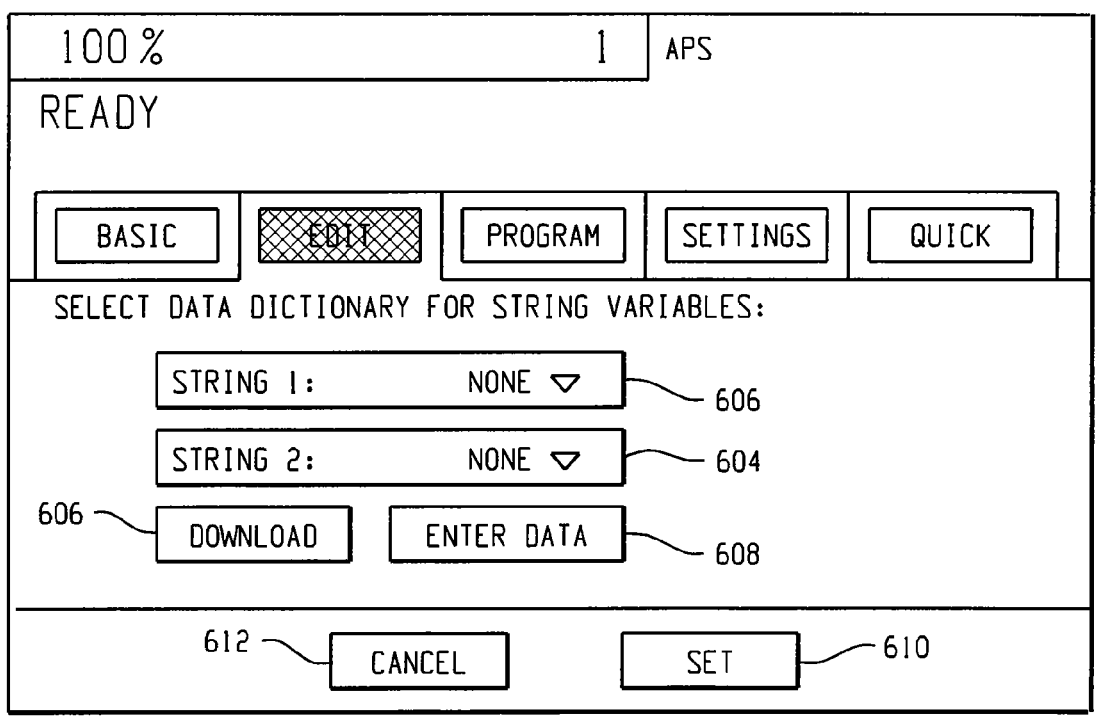
FIG. 6 is a sample template for selecting the parameters for a string variable.

If the user selects a string variable, the user then inputs the parameters associated with the string variable. FIG. 6 is a preferred sample screen display 600 for selecting such parameters. The user selects the appropriate string variable 602 or 604. The user then selects a data dictionary to be associated with the string variable. If the user selects the download option 606, the data dictionary is downloaded from a predefined location, such as a server, in a suitable file format or protocol to the document reading device. The data dictionary is then preferably stored in memory on the document reading device. In another embodiment (not shown), data dictionaries are uploaded from a client tool to the document reading device in a suitable file format or protocol. If the user selects the enter data option 608, the user is prompted by any suitable means to enter data associated with the data dictionary in the appropriate format. In a data dictionary, there are two fields, an index field and a string data field. An example is shown below.

| Index | String Data |
|-------|-------------|
| 1     | John Smith  |
| 2     | Jane Smith  |
| 3     | John Doe    |

According to this data dictionary, in the first set of copies, John Smith will be inserted into the document. In the second set of copies, Jane Smith will be inserted and so on. Preferably, if the index number is greater than the number of copies, the rest of the string data will not be inserted. Preferably, if the index number is less than the number of copies, the document reading device will return to the top of the index and retrieve the first string data until the copying or reproduction is complete. Once the user has selected the parameters for the string variable, the user can then select the Set button 610 to save the setting or the Cancel button 612 to cancel the settings entered. Once the user has selected the parameters for generating the image data and for the variables, the user initiates the process and the controller 104 begins the variable copying or reproduction process.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A document reproduction system comprising:
   means adapted for acquiring document image data representative of a document image in accordance with a copier scan operation;
   a memory for storing the document image data;
   means adapted for acquiring overlay placement data representative of a position of at least one selected overlay region relative to the image data;
   means adapted for generating a thumbnail image of the document image data inclusive of indicia corresponding to the position of the selected overlay region in accordance with the overlay placement data;
   overlay data input means adapted for receiving into the memory overlay data representative of supplemental information associated with the document image data wherein the overlay data includes a plurality of string variables and a plurality of number variables;
   means adapted for receiving parameter data corresponding to at least one of interval, start number, and digits associated with the number variables;
   association means adapted for selectively associating the overlay data with the at least one overlay region;
   overlay image generation means adapted for generating overlay image data corresponding to overlay data;
   generating means adapted for generating in the memory composite image data including the document image data and the overlay data disposed in an associated overlay region, wherein the overlay is positioned relative to the document image data in accordance with acquired placement data;
   means adapted for incrementing a number variable in connection with the parameter data so as to generate a series of composite image data such that the overlay image generation means generates overlay image data corresponding thereto; and
   output means adapted for rendering an output series of documents wherein each document of the series is formed in accordance with the series of composite image data.

2. The document reproduction system according to claim 1 further comprising means adapted for receiving selected data wherein such data is associated with at least one of the string variables and number variables.

3. The document reproduction system according to claim 1 further comprising means adapted for selecting the location of at least one overlay region of the image data.

4. The document reproduction system according to claim 1 further comprising a display for generating an image of the composite image data.

5. The document reproduction system according to claim 1 further comprising means adapted for generating the composite image data.

6. The document reproduction system according to claim 5 further comprising means adapted for selecting the parameters for generating the composite image data.

7. The document reproduction system according to claim 1 wherein the document reproduction system is selected from an image generating device and a multifunctional peripheral.

8. A method for reproducing documents comprising the steps of:

acquiring document image data representative of a document image in accordance with a copier scan operation;

storing the document image data in memory;

acquiring overlay placement data representative of a position of at least one selected overlay region relative to the image data;

generating a thumbnail image of the document image data inclusive of indicia corresponding to the position of the selected overlay region in accordance with the overlay placement data;

receiving into the memory overlay data representative of supplemental information associated with the document image data wherein the overlay data includes a plurality of string variables and a plurality of number variables;

receiving parameter data corresponding to at least one interval, start number, and digits associated with the number variables;

selectively associating the overlay data with the at least one overlay region;

generating overlay image data corresponding to overlay data;

generating, in the memory, composite image data including the document image data and the overlay data disposed in an associated overlay region, wherein the overlay data is positioned relative to the document image data in accordance with acquired placement data;

incrementing a number variable in connection with the parameter data so as to generate a series of composite image data such that the overlay image data is generated corresponding thereto; and rendering an output series of documents wherein each document of the series is formed in accordance with the series of composite image data.

9. The method according to claim 8 further comprising the step of receiving selected data wherein such data is associated with at least one of the string variables and number variables.

10. The method according to claim 8 further comprising the step of selecting the location of at least one overlay region of the image data.

11. The method according to claim 8 further comprising the step of generating an image of the composite image data on an associated display means.

12. The method according to claim 8 further comprising the step of generating the composite image data.

13. The method according to claim 12 further comprising the step of selecting the parameters for generating the composite image data.

14. The method according to claim 8 wherein the method is performed on a document reproduction system selected from an image generating device and a multifunctional peripheral.

15. A computer readable medium storing instructions capable of being executed by a computer for reproducing documents comprising:

instructions for acquiring document image data representative of a document image in accordance with a copier scan operation;

instructions for storing the document image data in a memory;

instructions for acquiring overlay placement data representative of a position of at least one selected overlay region relative to the image data;

instructions for generating a thumbnail image of the document image data inclusive of indicia corresponding to the position of the selected overlay region in accordance with the overlay placement data;

instructions for receiving into the memory overlay data representative of supplemental information associated with the document image data wherein the overlay data includes a plurality of string variables and a plurality of number variables;

instructions for receiving parameter data corresponding to at least one of interval, start number, and digits associated with the number variables;

instructions for selectively associating the overlay data with the at least one overlay region;

instructions for generating overlay image data corresponding to overlay data;

instructions for generating in the memory composite image data including the document image data and the overlay data disposed in an associated overlay region, wherein the overlay data is positioned relative to the document image data in accordance with acquired placement data;

instructions for incrementing a number variable in connection with the parameter data so as to generate a series of composite image data such that overlay image data is generated corresponding thereto; and instructions for rendering an output series of documents wherein each document of the series is formed in accordance with the series of composite image data.

16. The computer readable medium according to claim 15 further comprising instructions for receiving selected data wherein such data is associated with at least one of the string variables and number variables.

17. The computer readable medium according to claim 15 further comprising instructions for selecting the location of at least one overlay region of the image data.

18. The computer readable medium according to claim 17 further comprising instructions for selecting parameters for the at least one overlay region of the image data.

19. The computer readable medium according to claim 15 further comprising instructions for generating an image of the composite image data.

20. The computer readable medium according to claim 15 further comprising instructions for generating the composite image data.

21. The computer readable medium according to claim 20 further comprising instructions for selecting the parameters for generating the composite image data.

\* \* \* \* \*